United States Patent [19]

Forsythe et al.

[11] Patent Number: 5,325,882
[45] Date of Patent: Jul. 5, 1994

[54] PRESSURE AND THERMAL RELIEF VALVE FOR FUEL TANK

[75] Inventors: Alan K. Forsythe, Vashon; Zdenek Gabrlik, Seattle; John M. Morris, Auburn, all of Wash.

[73] Assignee: GT Development Corporation, Tukwila, Wash.

[21] Appl. No.: 256,911

[22] Filed: Oct. 12, 1988

[51] Int. Cl.$^5$ .................................................. B65D 51/16
[52] U.S. Cl. ........................................ 137/73; 137/43; 220/202
[58] Field of Search ................. 137/43, 72, 73, 74, 137/80; 220/89 B, 202, 203, DIG.33

[56] References Cited

U.S. PATENT DOCUMENTS

| | | | |
|---|---|---|---|
| 1,686,875 | 10/1928 | Nelson et al. | 137/73 |
| 1,724,878 | 8/1929 | Jensen | 137/43 |
| 2,271,786 | 2/1942 | Watkins | 137/53 |
| 2,357,681 | 9/1944 | Morton | 116/106 |
| 2,375,832 | 5/1945 | Tyden | 169/39 |
| 2,489,787 | 11/1949 | Knowlton | 220/89 |
| 3,040,764 | 6/1962 | Feinberg | 137/73 |
| 3,669,302 | 6/1972 | Markarian | 220/44 R |
| 3,918,606 | 11/1975 | Keller | 220/208 |
| 4,325,398 | 4/1982 | Green | 137/39 |
| 4,457,325 | 7/1984 | Green | 137/39 |
| 4,458,711 | 7/1984 | Flider | 137/71 |
| 4,487,215 | 12/1984 | Green | 137/43 |
| 4,666,058 | 5/1987 | Harris | 220/373 |
| 4,732,188 | 3/1988 | Gabrlik et al. | 137/73 |
| 4,796,777 | 1/1989 | Keller | 220/203 |

*Primary Examiner*—John C. Fox
*Attorney, Agent, or Firm*—Joan H. Pauly; Delbert J. Barnard

[57] ABSTRACT

A valve plug is biased inwardly by a spring (90) to close an opening (10) in a cap (2) for a fuel tank filling and venting tube. A valve stem includes a first portion (62) which is engaged by the spring (90) and a second float cage portion (40) that is secured to and extends axially inwardly from the plug. A collapsible retainer (70) is secured to the cage (40) and has an abutment surface (74) which engages an abutment surface (68) on the first portion (62) to hold the cage (40) and the first portion (62) in position relative to each other and to transmit axial forces therebetween. A fusible material ring (88) is positioned radially between the retainer (70) and the cage (40) to prevent the retainer (70) from collapsing. At elevated temperatures, the ring (88) melts to allow the retainer (70) to collapse, the cage (40) and first stem portion (62) to separate from each other, and the valve plug and cage (40) to move away from the opening (10).

36 Claims, 5 Drawing Sheets

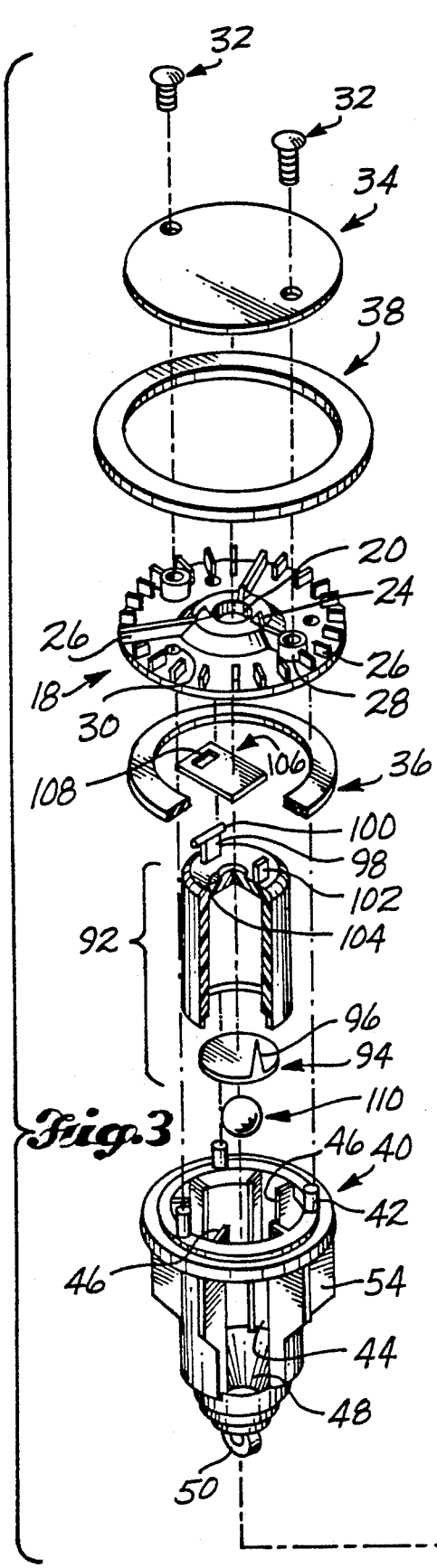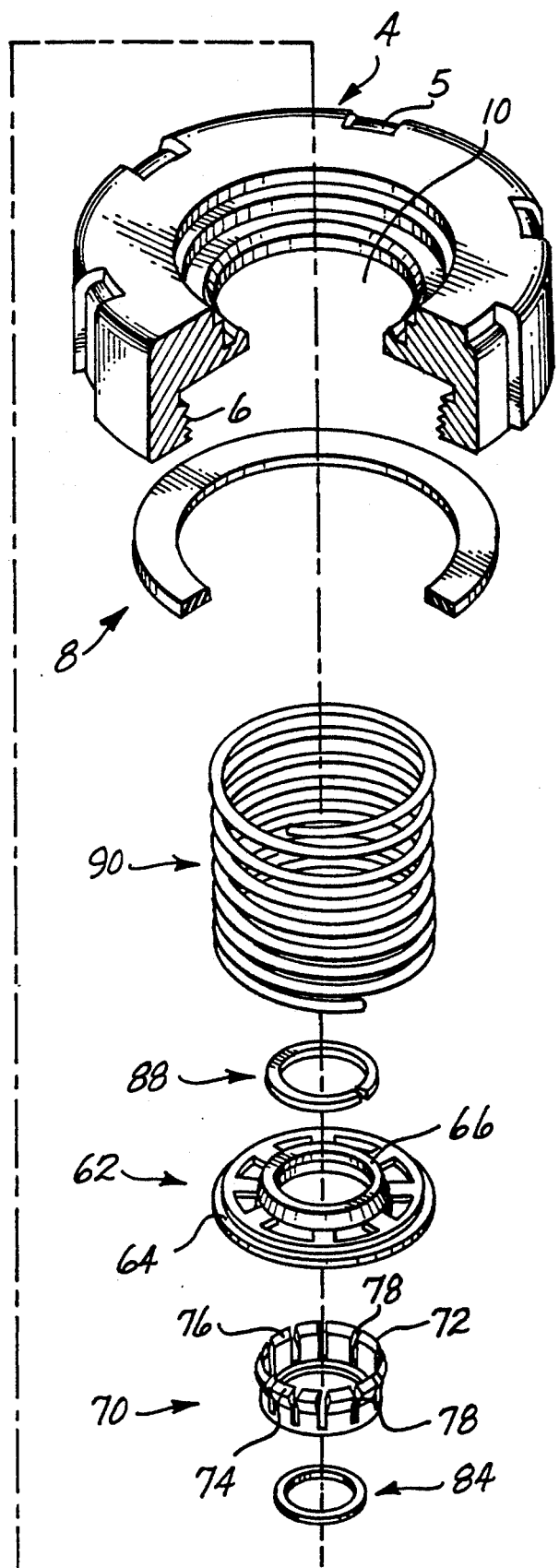
Fig. 3

PRESSURE AND THERMAL RELIEF VALVE FOR FUEL TANK

TECHNICAL FIELD

This invention relates to pressure relief valves and, more particularly, to such a valve in a fuel tank cap which has an inwardly biased valve plug and stem for pressure relief, and a radially deflectable retainer that transmits axial forces between first and second portions of the stem and is prevented from deflecting by fusible material which melts at elevated temperatures to allow the stem portions to separate and the plug to move away from the valve seat.

BACKGROUND ART

Fuel tanks on vehicles are subject to a number of safety requirements. These requirements include a venting system for relieving pressure in the tank when such pressure exceeds a predetermined level and a thermal relief system for preventing explosions when the temperature in the tank becomes excessive.

One known type of venting system is a pressure relief valve having a valve plug that is positioned outwardly of a vent opening in the valve housing and is spring biased to close the opening. A valve stem is attached to the plug and extends inwardly therefrom into the tank. The inner end of the stem carries a spring abutment for one end of a compression spring. The other end of the spring abuts the valve housing around the vent opening. The spring is calibrated to allow the valve plug and stem to move outwardly to relieve pressure when the pressure exceeds a predetermined level and to reseat the valve plug to close the vent opening when the pressure drops back down to an acceptable level. This valve arrangement has the advantages of simplicity of construction, reliability, and low cost.

One approach to providing thermally activated pressure relief is the use of a fusible material that melts at elevated temperatures to cause a vent opening or openings to be uncovered. The fusible material may itself be the cover for the opening, or it may be used to attach a nonfusible material cover to another portion of the venting structure. The latter arrangement has the advantages of allowing a relatively large opening to be uncovered very quickly and of requiring only small amounts of fusible material.

The separate provision of a pressure relief valve and thermal relief based on the melting of fusible material tends to complicate the overall structure of a safety system. Forming the stem from inner and outer portions which are held together by a fusible material permits the system's structure to be simplified. An example of this approach is disclosed in U.S. Pat. No. 4,732,188, granted Mar. 28, 1988, to Z. Gabrlik et al., and assigned to the assignee of the present application. In that patent, a major problem with the approach was recognized. This problem is that the stem in such a valve arrangement is subjected to significant tension forces by the biasing means, proportional to the amount of pressure required to activate the valve to vent the tank. Known fusible materials that are practical for use in a tank thermal relief system do not have sufficient strength to maintain their structural integrity at realistic venting pressures. Therefore, fusible materials are not practical for use as a direct load-carrying link in a valve stem. The solution to this problem arrived at in the above-cited patent was to arrange the inner and outer portions of the stem in a mechanically interlocking, load-transmitting position and to use the fusible material to maintain the stem portions in this position. In two embodiments disclosed in the patent, fusible material plugs extended radially through adjacent aligned openings in the inner and outer portions to hold the inner and outer portions together. In a third embodiment, the inner portion is formed of two legs, and the fusible material is positioned radially between the two legs.

U.S. Pat. No. 1,686,875, granted Oct. 9, 1928, to I. I. Nelson et al., discloses a spring biased pressure relief valve for a boiler. The valve has an inner chamber and an outer chamber. A valve element closes a passageway between the two chambers. Pressure in the boiler exceeding a predetermined amount causes the valve element to move upwardly to open the passageway to allow fluid to move from the inner chamber to the outer chamber and out through an outlet. A valve stem extends upwardly from the valve element. A spring positioned externally of the valve casing is positioned between the head of an adjustment screw and the upper end of the stem to bias the valve element into a closed position. The upper portion of the stem which abuts the spring is fusible to melt at a predetermined external temperature to release the spring. This is described as permitting the valve to operate independently of excess pressure in the boiler.

U.S. Pat. No. 3,040,764, granted Jun. 26, 1962, to A. R. Feinberg, discloses a relief valve for fluid storage tanks, such as hot water tanks, which is actuated in response to predetermined fluid temperature or fluid pressure conditions within the tank. The valve includes a rod that extends through the valve seat and terminates at its inner end in a chisel-like point that is urged against a fusible body. A spring is positioned between an abutment carried by the rod and an abutment carried by the valve element to hold the valve closed. High temperature conditions cause the fusible body to melt to allow the rod to move inwardly and thereby release the spring and allow the valve to open.

U.S. Pat. No. 1,724,878, granted Aug. 13, 1929, to J. A. Jensen, discloses a vent device for tanks of vehicles that transport liquid fuels and the like in bulk. A top disk that forms a cover melts under fire conditions to allow a ball valve element to be expelled. A second ball valve element seats in an overturn condition. U.S. Pat. Pat. No. 4,458,711, granted Jul. 10, 1984, to F. S. Flider, discloses a vent valve with a plastic housing which has a thin walled break-away top portion to provide an enlarged aperture under severe over-pressurization and which melts under severe fire conditions to provide an even larger aperture for maximum venting. C. J. Green discloses vehicle fuel tank valves for relieving pressure and preventing liquid spillage in U.S. Pats. No. 4,325,398, granted Apr. 20, 1982; U.S. Pat. No. 4,457,325, granted Jul. 3, 1984; and U.S. Pat. No. 4,487,215, granted Dec. 11, 1984. Each of these three patents also discloses the use of fusible material for attaching a portion of the valve housing that covers a large vent opening to the rest of the housing. U.S. Pat. No. 2,489,787, granted Nov. 29, 1949, to E. W. Knowlton, discloses a safety cap for tanks or containers used for storing fluids like gasoline. The cap has a ball valve which relieves pressure. A fusible disk melts under high temperatures to uncover vent openings. The melting of the disk does not directly affect the functioning of the valve.

U.S. Pat. No. 3,918,606, granted Nov. 11, 1975, to R. D. Keller, discloses a fuel tank filler cap with a pressure relief valve having a spring biased valve plug and a stem which carries a spring abutment. The cap body has a separate vent valve with a ball that rolls in a retainer to close the vent opening when the cap is in a tilted orientation.

U.S. Pat. No. 2,357,681, granted Sep. 5, 1944, to C. R. Morton, discloses a fire detecting and alarm device in which each end of a spring is held down by a strip with a section of fusible material that melts at a predetermined temperature to release the spring. The manner in which the section of fusible material is incorporated is not disclosed. The device also has plugs that are held in openings in containers of fire extinguishant by fusible material that melts to release the extinguishant. U.S. Pat. No. 2,375,832, granted May 15, 1945, to E. Tyden, discloses an automatic fire protection sprinkler head in which a lever is held in position by a retainer which is in turn adhesively held to the spreader portion of the head by a fusible material. Under fire conditions, the fusible material melts to allow the lever to displace the retainer and release the cap on the nozzle. The lateral stress in the lever under normal conditions is described as being resisted by the normal friction between the spreader and the retainer and the adhesive quality of the fusible material. U.S. Pat. No. 3,669,302, granted Jun. 13, 1972, to M. Markarian, discloses an electrolytic capacitor that has a vent opening sealed by a fusible material.

DISCLOSURE OF THE INVENTION

In the present invention, like the invention disclosed in U.S. Pat. No. 4,732,188, fusible material is incorporated into the valve stem and is positioned to maintain two portions of the stem in a force transmitting position but to be out of the axial load-transmitting path. This accomplishes the purpose of achieving a relatively simple valve structure and reliable thermal relief without impairing the structural integrity of the stem.

A subject of the present invention is a pressure relief valve for a tank comprising a valve plug, a stem, and biasing means. The valve plug is positioned outwardly of an opening in the tank. The stem has first and second portions, with the second portion being attached to the valve plug. The biasing means exerts an axial, inward force on the first portion of the stem to put the stem in tension and bias the valve plug into a position in which it closes the opening. One of the first and second portions has a first abutment surface. The stem includes a deflectable retainer portion carried by the other of the first and second portions and has a second abutment surface positioned to abut the first abutment surface to transmit axial forces between the first and second portions. The fusible material is positioned radially between said other portion and the retainer portion substantially opposite said one portion to prevent the retainer portion from deflecting and to maintain the abutment surfaces in an abutting relationship, to in turn maintain the first and second portions in a force transmitting position relative to each other. The biasing means is resilient to allow the stem and the valve plug to move outwardly in response to increased pressure in the tank to relieve pressure in the tank. The fusible material is meltable at elevated temperatures exceeding a predetermined level, to allow the retainer portion to deflect, the first and second portions to separate from each other, and the valve plug and the second portion to move away from the opening. In the preferred embodiment, the first abutment surface is formed by the first portion, and the retainer portion is carried by the second portion. Preferably, the abutment surfaces slope radially outwardly and axially inwardly.

As used herein with reference to the stem retainer portion, the term "deflectable" means capable of collapsing inwardly, spreading outwardly, or, in the case of a retainer formed by separate pieces, falling out of position.

A feature of the invention is a retainer portion that comprises an annular axially extending portion with a plurality of axial slots extending radially therethrough to allow the axially extending portion to deflect radially when the fusible material melts. The second abutment surface is formed by the axially extending portion, and the fusible material is positioned radially between said other portion and the axially extending portion. In the preferred embodiment, the first abutment surface is formed by the first portion, the retainer portion further comprises a radial portion extending radially inwardly from the axially extending portion and secured to the second portion, and the fusible material prevents the axially extending portion from deflecting radially inwardly.

Another feature of the invention is a second portion that forms a cage, and a valve plug with a vent opening for venting the tank. The biasing means is calibrated to allow the stem and the valve plug to move outwardly when the pressure in the tank reaches a predetermined magnitude. The valve further comprises a float positioned in the cage and a valve element carried by the float to close the vent opening in response to a rising liquid level in the cage. An advantage of this feature is that it supplies in one relatively simple structure two venting modes and protection against spillage of liquid. The first venting mode allows day-to-day venting through the vent opening under normal conditions of relatively low pressure in the tank. The second mode is a safety release when the pressure in the tank reaches higher levels that equal or exceed a predetermined magnitude. In the second mode, the stem and valve plug move outwardly against the force of the biasing means.

According to an aspect of the invention, the fusible material is positioned on an axially inner portion of the stem to expose it directly to temperatures inside the tank. This positioning of the fusible material makes it sensitive to internal tank temperatures, rather than to temperatures external to the tank. Therefore, thermally activated relief is provided when, and only when, it is actually needed.

Another subject of the invention is an improvement in a cap for closing a fuel tank filling and venting tube, said cap being of the type having a main body with a central axial opening and means for detachably engaging the tube, and a pressure relief valve, said valve having a valve plug positioned outwardly of the opening, a stem attached to the valve plug, and biasing means for exerting an axial, inward force on the stem to put the stem in tension and bias the valve plug into a position in which it closes the opening. According to an aspect of the invention, the improvement comprises a first portion, a second portion, and a retainer portion of the stem and fusible material as described above. The improvement may include any or all of the preferred features discussed above.

When the second portion of the stem forms a cage and the valve plug has a vent opening, the cap preferably has passageway means communicating the vent opening with the exterior of the body. The preferred structure for forming the passageway means includes a valve plug comprising a popper plate through which the vent opening extends, and a cover spaced axially outwardly from the plate. The cap has a first seal between the plate and the main body of the cap, and a second seal between the cover and said main body. The passageway, means extends from the vent opening, between the plate and the cover and between the first and second seals, and through said main body. This arrangement provides the two venting modes described above, thermally activated relief, protection against spillage, and protection against contaminants entering the valve.

In improved caps of the invention, the preferred positioning of the fusible material on an inner portion of the stem exposes the material to the fuel when the cap and the tank in which it is installed are in an overturned condition. This makes the melting of the fusible material and the consequent pressure relief sensitive to the fuel temperature, which is directly related to the vapor pressure in the tank. Therefore, the rapid pressure relief provided by the release of the valve plug occurs in response to actual pressure conditions in the tank.

Another subject of the invention is an improvement in a cap for closing a fuel tank filling and venting tube, said cap being of the type having a main body with a central axial opening and means for detachably engaging the tube, and a pressure relief valve. The valve has a valve plug positioned outwardly of the opening, a stem attached to the plug, and biasing means for biasing the plug into a position in which it closes the opening. According to an aspect of the invention, the improvement in the cap comprises a valve plug that includes a popper plate with a vent opening extending axially therethrough, and a cover spaced axially outwardly from the plate. A cage is formed by the stem and extends axially inwardly from the plate. A float is positioned in the cage. A valve element carried by the float closes the vent opening in response to a rising liquid level in the cage. First and second seals are provided between the plate and the main body of the cap, and between the cover and said main body, respectively. Passageway means extends from the vent opening, between the plate and the cover and between the seals, and through the main body of the cap to an exterior surface thereof. The biasing means is calibrated to allow the stem and valve plug to move outwardly when the pressure in the tank reaches a predetermined magnitude. Preferably, the passageway means extends through the main body substantially laterally outwardly and then substantially axially inwardly to said exterior surface.

The advantages of apparatus constructed according to the present invention include advantages similar to those of the invention disclosed in U.S. Pat. No. 4,732,188. The present invention helps maximize the simplicity of construction and cost effectiveness of a tank safety system which provides both pressure activated relief and thermally activated relief. The invention provides both reliable pressure relief and reliable thermal relief. The overall structure of the apparatus is durable, reliable, and easy and inexpensive to manufacture and maintain. The preferred construction of the retainer portion of the stem is simple and economical and readily lends itself to forming the retainer portion separately from the inner and outer portions. This facilitates assembly of the valve and allows the retainer to be made from a flexible material and the first and second portions to be made from a rigid material. The preferred retainer structure is also highly compatible with the feature of an outer portion that forms a cage. The preferred orientation of the abutment surfaces provides the desired transmission of axial forces while helping ensure the separation of the inner and outer portions upon melting of the fusible material. In embodiments of the invention that comprise an improvement in caps for closing fuel tank filling and venting tubes, the economy of structure and cost effectiveness is further increased.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 3 is an exploded pictorial view of the cap shown in FIGS. 1 and 2.

FIG. 8 is an enlarged fragmentary sectional view of the connection between the popper plate and the cage.

FIG. 9 is a fragmentary sectional view showing an alternative embodiment of the vent passageway in the cap body.

BEST MODE FOR CARRYING OUT THE INVENTION

Figure 1:
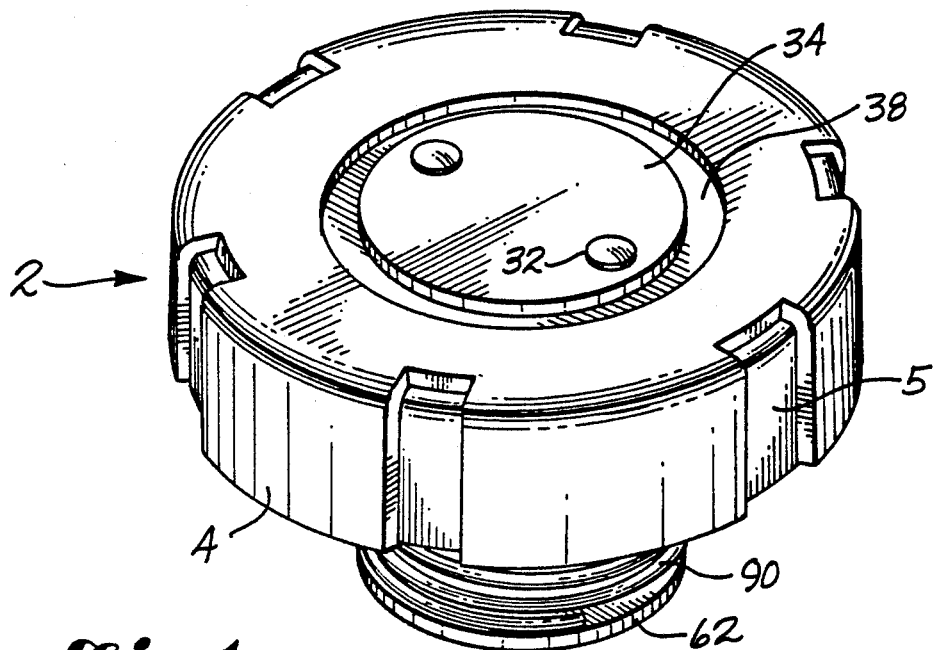
FIG. 1 is a pictorial view of a cap for closing a fuel tank filling and venting tube which constitutes the preferred embodiment of the invention.

The drawings show a pressure relief valve that is constructed according to the invention and that also constitutes the best mode of the invention currently known to the applicants. In the drawings, the valve of the invention is shown incorporated into a cap 2 for closing a fuel tank filling and venting tube. It is anticipated that the valve of the invention will be used primarily by incorporating it into caps for closing fuel tank filling and venting tubes, and more specifically in caps of the type shown in the drawings. However, it is of course to be understood that the valve of the invention may also be used to advantage in other types of caps and in other types of installations separate from such caps.

Figure 7:
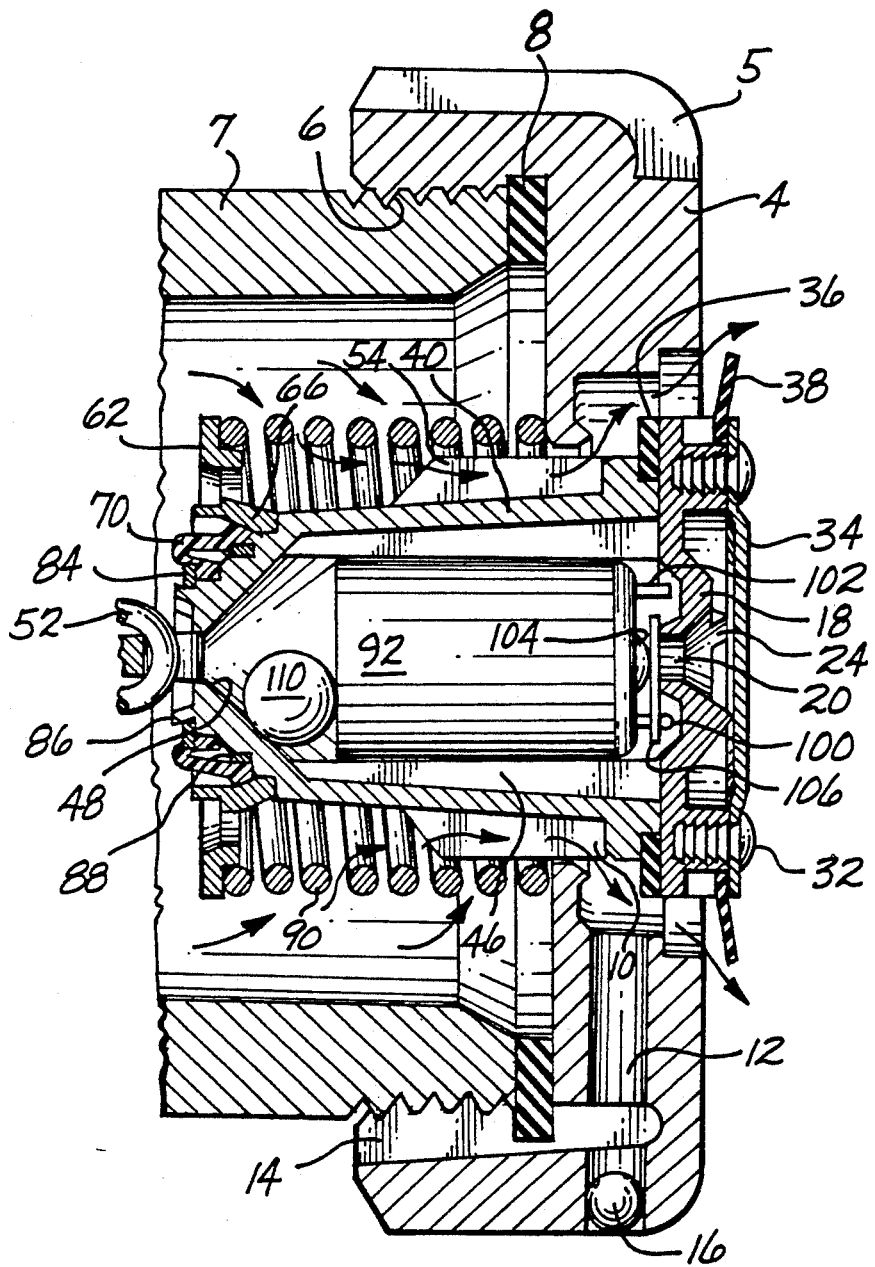
FIG. 7 is a sectional view of the cap shown in FIGS. 1-3 attached to a filling and venting tube and in an overturned condition, with the float shown in elevation and the valve plug and stem moved outwardly to vent the fuel tank.

The cap 2 shown in the drawings includes a main body 4 with a central axial opening 10. The inner circumferential surface of the body 4 has internal threads 6 formed thereon for threadedly engaging a filler tube 7, as shown in FIG. 7. The outer circumferential surface of the body 4 has recesses 5 formed thereon to facilitate gripping the body 4 when it is being attached to or detached from the tube 7. When the cap 2 is secured on the tube 7, a gasket 8 seals the interface between the top of the tube 7 and an inner surface of the cap body 4.

Figure 2:
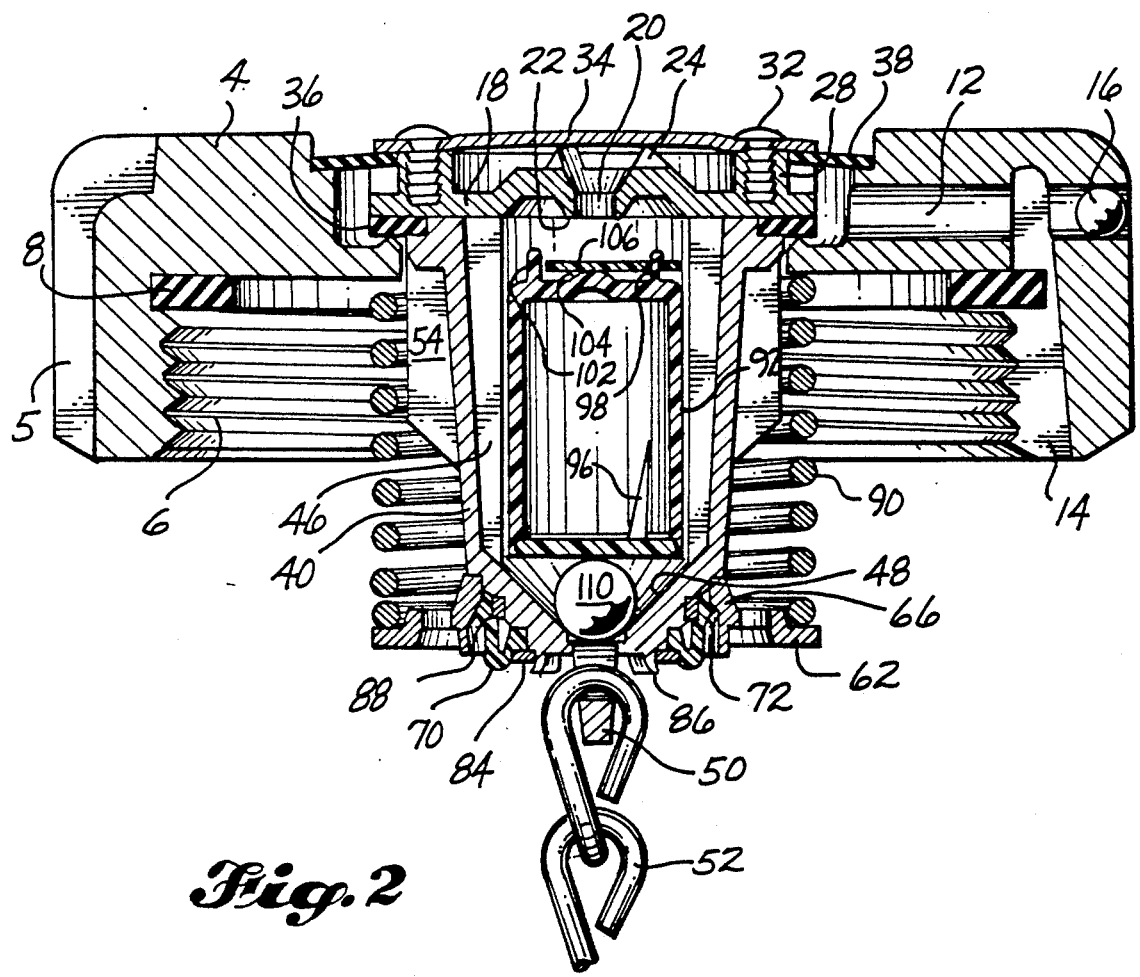
FIG. 2 is a sectional view of the cap shown in FIG. 1.

The cap 2 has passageway means for communicating a vent opening 20 in the valve of the invention with the exterior of the body 4. Referring to FIGS. 2 and 7, the passageway means includes a horizontal passage 12 extending radially from a center portion of the cap body 4 to the exterior circumferential surface of the cap body 4. A metal ball 16 is interference fit into the outer end of the passage 12 to close the outer end. Inwardly of the ball 16, the passage 12 is in open communication with a vertical passage 14 that interrupts the threads 6 and extends downwardly (axially inwardly) to the exterior bottom surface of the cap body 4. Preferably, a plurality of circumferentially spaced horizontal passages 12 and corresponding vertical passages 14 are provided. In the preferred embodiment, for example, there are three sets of passages, 12,14.

FIG. 9 shows a modification of the horizontal passage 12'. The modified passage 12' slopes downwardly and terminates at the vertical passage 14. Therefore, the passage 12' does not extend to the outer circumferential surface of the cap body 4 and there is no need for a closure ball 16. The modified passageway arrangement shown in FIG. 9 is preferred when the dimensions of the cap body 4 accommodate the boring of the sloping passage 12'. When the dimensions of the cap body 4 do not accommodate this operation, the horizontal passage 12 must be bored from the outer circumferential surface of the cap body 4, as shown in FIG. 2.

The pressure relief valve of the invention includes a valve plug positioned outwardly of the axial opening 10 in the cap body 4. Referring to FIGS. 2, 3, 7, and 8, the valve plug of the preferred embodiment includes a popper plate 18 and a cover disk 34 which is secured to the plate 18. The valve of the invention also includes a stem having a first axially inner portion 62, a second axially outer portion 40 attached to the valve plug, and a retainer portion 70. A coil spring 90 is positioned with its outer end abutting the inside surface of the cap body 4 around the opening 10 and its inner end abutting a spring abutment 64 formed on the first portion 62 of the stem. The spring 90 exerts an axial, inward force on the first portion 62 to put the stem in tension and bias the valve plug into a position in which it closes the opening 10.

The popper plate 18 is best seen in FIGS. 2, 3, and 7. It is generally disk-shaped and has a raised center portion through which a vent opening 20 extends axially. A valve seat 22 surrounds the inner end of the opening 20. Three triangular spacers 24 extend axially outwardly from the outer radial surface of the plate 18 around the outer end of the opening 20. The outer radial surface of the plate 18 also has a plurality of axially projecting, radially disposed spacers 26. All but three of these spacers 26 extend radially inwardly only along a peripheral portion of the plate surface to facilitate flow of fuel vapors along the radial surface and around the vent opening 20. The upper radial surface of the plate 18 also has two lugs 28 formed thereon for receiving fasteners 32 for attaching the cover disk 34 to the plate 18. The fasteners may be of any suitable type, such as the drive pins 32 shown in FIGS. 1-3 and 7. The spacers 24,26 and the lugs 28 function to maintain the cover disk 34 spaced axially outwardly from the outer radial surface of the popper plate 18 to ensure free flow of vapor and proper venting of the tank. The radial spacers 26 also provide a resting place for a cover gasket 38 that sealingly engages the inner peripheral surface of the cover disk 34 and an outwardly facing radial shoulder formed on the cap body 4. The interface between the poppet plate 18 and the cap body 4 is sealed by a poppet gasket 36 that is carried by the plate 18 and the cage 40.

In the preferred embodiment shown in the drawings, the second portion of the stem forms a cage 40. The open top of the cage 40 is closed by the poppet plate 18 to which the cage 40 is secured and from which the cage 40 extends axially inwardly. The manner in which the plate 18 and cage 40 are secured together is illustrated in FIG. 8. The upper annular radial surface of the cage 40 has three circumferentially spaced pins 42 formed thereon and projecting axially therefrom. During assembly of the valve, the pins 42 are received into aligned holes 30 extending through the popper plate 18. The outer ends of the pins 42 are then upset to form rivet-like heads, as shown in FIG. 8, to secure the cage 40 to the plate 18.

A float 92 is positioned in the cage 40 and carries a valve element 106 for sealingly engaging the valve seat 22 around the vent opening 20 when the liquid level in the cage 40 rises, such as when the fuel in the tank sloshes or the tank is in an overturned position. The seating of the valve element 106 prevents liquid fuel from exiting the cap 2 through the vent opening 20 and the passages 12,14. The cage 40 has three circumferentially spaced openings 44 extending radially therethrough to allow free fluid flow into and out from the interior of the cage 40. The inner circumferential surface of the cage 40 has a plurality of axially extending ribs 46 projecting radially therefrom to guide movement of the float 92 in the cage 40. The radial extent of the ribs 46 is sufficient to prevent liquid surface tension from holding the float 92 up when the liquid level in the cage 40 falls. The upper portion of the cage 40 has a plurality of axially extending, radially projecting guides 54.

The bottom of the cage 40 forms a frustoconical inner surface 48. A weighted ball 110 is positioned in the cage 40 between the frustoconical surface 48 and the float 92. In normal operation of the valve, the ball 110 rests on the bottom of the surface 48, as shown in FIG. 2. The bottom center portion of the wall 48 has a hole formed therein to facilitate drainage of liquid from the cage 40. An eye 50 is formed on the bottom end of the cage 40 to provide means for attaching a chain 52 to the cage 40. The other end of the chain 52 is attached to a chain stay (not shown) to prevent the cap 2 from being completely detached from the tube 7 and thereby prevent its loss, as is known in the art. The outer surface of the bottom portion of the cage 40 has radial stop surfaces 56,58,60 formed thereon for the purposes described below.

The first portion of the stem comprises a disk-like member 62 that is secured to the bottom portion of the cage 40 by the retainer 70. The outer periphery of the member 62 forms the spring abutment 64. The center portion of the member 62 has an annular projection 66 extending axially outwardly therefrom. This projection 66 surrounds an axial opening into which the retainer 70 is received. A radially outwardly and axially inwardly sloping surface of the member 62 surrounding the opening forms a first force-transmitting abutment surface 68. In the assembled valve, this surface 68 abuts a surface 74 on the retainer 70 to transmit axial forces between the first and second portions 62,40 of the stem.

In the preferred embodiment of the valve, the retainer portion 70 of the stem is formed separately from the first and second portions 62,40. The retainer 70 takes the form of a collet which has an annular axially extending portion 72. A plurality of axial slots 78 extend radially through the axial portion 72 to allow the axial portion 72 to deflect (collapse) radially. The retainer 70 may conveniently be formed from a plastic material that has sufficient flexibility to provide the desired deflectability (collapsibility). An outer radially outwardly and axially inwardly sloping surface of the axial portion 72 forms the abutment surface 74 referred to above. The collet 70 has a radial portion 80 extending radially inwardly from the axial portion 72 and secured to the axially inner bottom portion of the cage 40. A washer 84 engages a downwardly facing radial shoulder 82 formed on the radial portion 80 of the retainer 70 and the bottom surface of the cage 40. A pair of arcuate tabs 86 are formed on the bottom of the cage 40 and are swaged radially outwardly, as shown in FIGS. 2 and 4-7, to secure the washer 84 and thereby secure the retainer 70 to the cage 40. The radial surface of the retainer 70 opposite the shoulder 82 abuts annular stop shoulder 60 on the cage 40 to hold the retainer 70 in position.

A split ring 88 of fusible material surrounds the bottom portion of the cage 40 and is positioned radially between the cage 40 and the axial portion 72 of the retainer 70 opposite the abutment surfaces 68,74. The ring 88 is positioned axially between the annular stop shoulder 58 on the cage 40 and a stop shoulder 76 formed on the radially inner surface of the axial portion 72. The ring 88 prevents the axial portion 72 of the retainer 70 from deflecting and maintains the abutment surfaces 68,74 in an abutting relationship. This in turn maintains the cage 40 and first stem portion 62 in a force transmitting position relative to each other. Axial forces are transmitted between the cage 40 and the first portion 62 via the retainer 70.

The upper radial surface of the annular projection 66 on the first portion 62 abuts stop shoulder surfaces 56 on the cage 40. The surfaces 56 are formed by the bottom surfaces of the solid portions of the cage sidewall and are interrupted by the openings 44. The surfaces 56 help to ensure the maintenance of the proper position of the first portion 62 in the assembled valve structure.

Certain aspects of the float 92 and the valve element 106 are the subject matter of a commonly owned copending patent application. The float 92 is formed of lightweight plastic and comprises a hollow cylindrical body with a closed top and an open bottom. A bottom lid 94 snaps onto the main body to close the bottom and is held in engagement therewith by a circular tongue and groove arrangement. A flexible finger 96 that extends perpendicularly upwardly from the top surface of the bottom lid 94 facilitates handling of the lid 94 and provides a means for adjusting the weight of the float 92. The length of the finger 96 may be adjusted to adjust the weight of the float 92 to meet the requirements of a particular application without changing the basic configuration of the float.

The top surface of the float 92 is flat with a rounded outer periphery. A rounded protuberance 104 is formed on the center portion of the top surface. A mounting post 98 and a stop post 102 project perpendicularly upwardly from diametrically opposite portions of the flat top surface. The posts 98,102 are positioned near the outer edge of the flat portion of the top surface and are spaced radially outwardly from the rounded protuberance 104. The mounting post 98 has a rectangular main portion and terminates at its upper end in a head 100. The head 100 is wider in a chordal direction than the main portion.

The flat valve element 106 is pivotably mounted on the main portion of the mounting post 98. The head 100 retains the element 106 on the post 98. The main portion of the post 98 is received through a rectangular hole 108 that extends through the valve element 106. The valve element 106, the hole 108, and the mounting post 98 are dimensioned to permit the valve element 106 to pivot on the post 98 about a horizontal axis that extends through and parallel to the post 98 in a chordal direction.

The operation of the valve is as follows. The normal venting position of the valve is shown in FIG. 2. In this position, the valve and the tank (not shown) on which it is installed are in a normal upright position, and the liquid fuel level in the tank is below the valve chamber defined by the cage 40. The float 92 is resting on the ball 110. The center portion of the valve element 106 is resting on the protuberance 104, and the attached end of the element 106 is adjacent to the post head 100. Vapor in the tank is freely vented through the valve. The vapor enters the valve cage 40 through the openings 44, flows up and around the float 92 and out of the cage 40 through the vent opening 20 into the space between the poppet plate 18 and the cover disk 34, flows between the plate 18 and the cover disk 34 around the spacers 24,26 and lugs 28 and between the gaskets 36,38 into the horizontal passages 12 formed in the cap body 4, and exits the cap body 4 through the vertical passages 14.

The venting described above occurs during day-to-day operation of the valve when the tank is upright and the pressure in the tank does not exceed a predetermined magnitude. The valve also has another mode of venting that occurs when the pressure in the tank reaches or exceeds the predetermined magnitude, such as when venting through the vent opening 20 is precluded by seating of the valve element 106 caused by fuel entering the cage 40 when the vehicle in which the tank is installed overturns. This second mode is illustrated in FIG. 7. The spring 90 is calibrated to allow the stem and the valve plug to move outwardly away from the opening 10 in the cap body 4 when the pressure in the tank reaches the predetermined magnitude. This provides safety venting to quickly vent the pressure and bring it back down to a safer level. The outward movement of the valve plug and stem allows free flow of vapor, or fuel in the case of an overturned condition, out of the cap body 4 around the cage 40 and through the axial opening 10, as shown in FIG. 7. The annular portion of the opening 10 around the cage 40 provides a relatively large total vent opening area for rapid pressure relief.

During the day-to-day operation of the valve illustrated in FIG. 2 and the pressure venting operation illustrated in FIG. 7, the retainer 70 holds the first and second stem portions 62,40 in an axial force transmitting position relative to each other so that the stem functions as an integral structure. This allows the valve to function in the manner of known types of popper valves to maintain the valve plug in a closed position, as shown in FIG. 2, and to vent pressure, as shown in FIG. 7. The abutment of the retainer abutment surface 74 against the first stem portion abutment surface 68 allows axial forces to be transmitted between the first stem portion 62 and the second stem portion 40 through the retainer 70. The fusible material ring 88 maintains the retainer 70 in its operational position shown in FIGS. 2, 4, and 7. The ring 88 accomplishes this by preventing inward radial movement or deflection of the axial portion 72 of the retainer 70. The fusible material ring 88 is required to withstand only the radial forces on the retainer portion 72. It is out of the axial force pathway of the stem and is not required to withstand the much greater axial tension forces exerted on the stem by the spring 90. Therefore, the ring 88 may be made from fusible materials of known types that are practical for use in a tank thermal relief system but would not have sufficient strength to form a load-carrying link in the stem.

Figure 4:
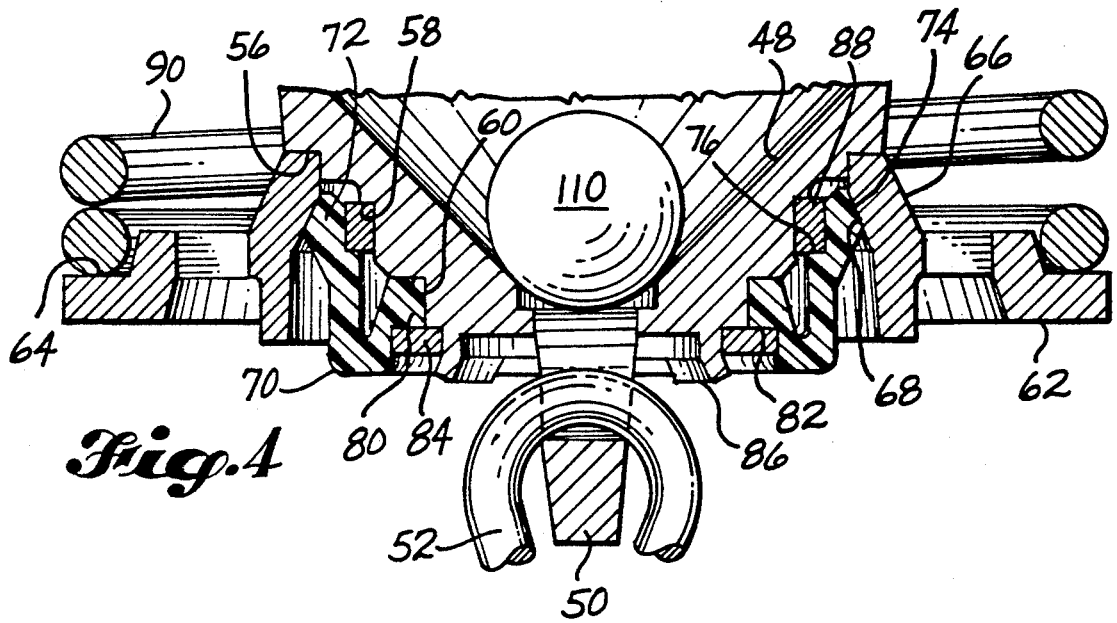
FIG. 4 is an enlarged fragmentary view of the bottom portion of FIG. 2.
Figure 5:
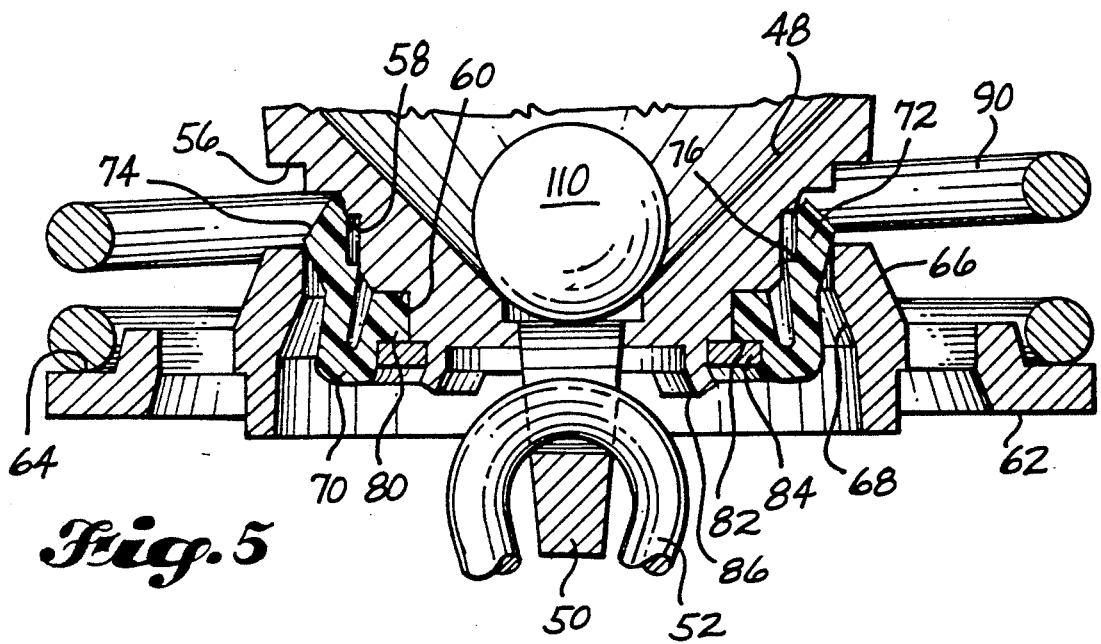
FIG. 5 is like FIG. 4 except that it shows the fusible material melted and the inner portion of the stem moving away from the outer portion.
Figure 6:
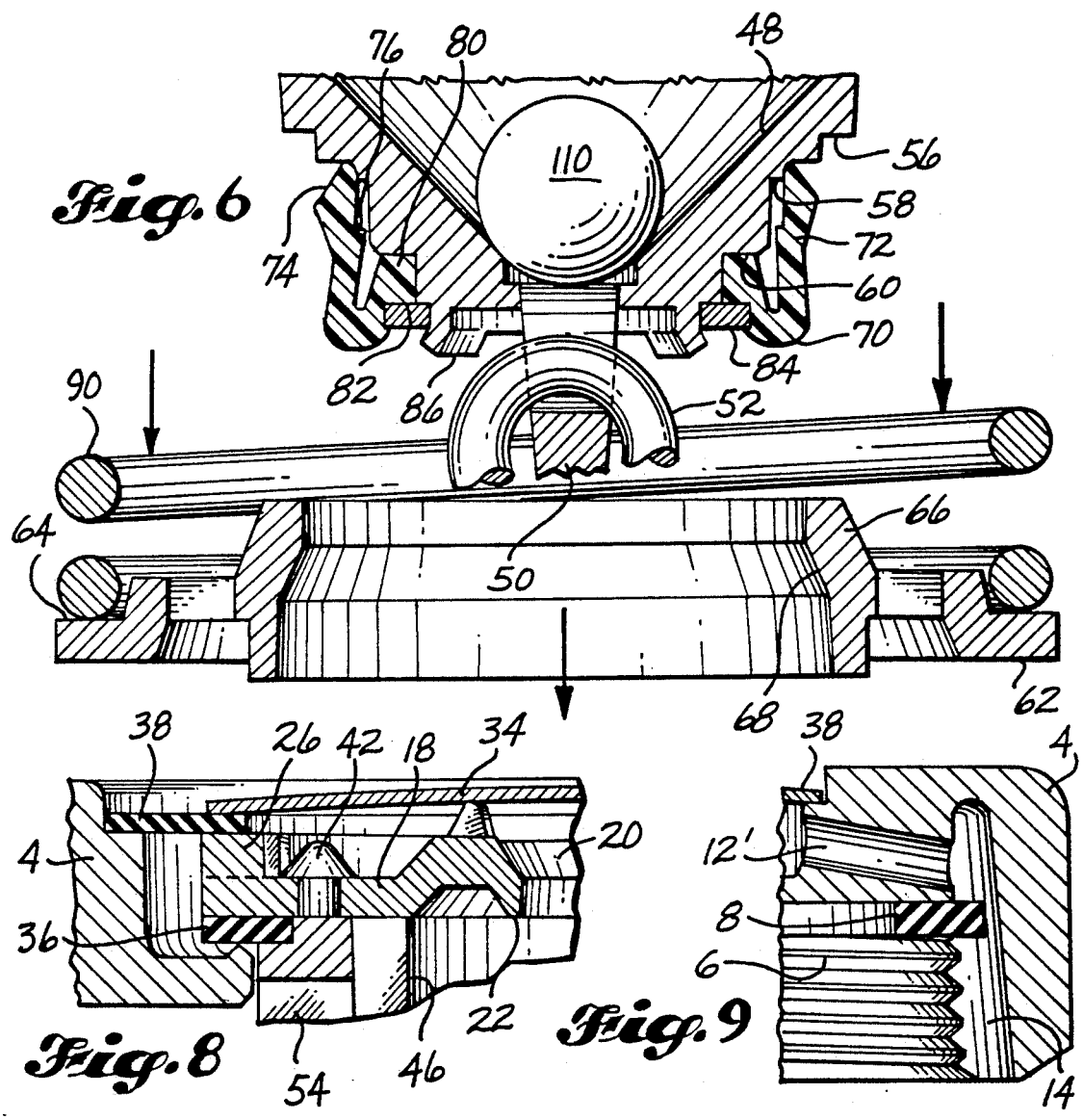
FIG. 6 is like FIG. 5 except that it shows the inner portion of the stem separated from the outer portion.

The thermal relief aspect of the valve operation is illustrated in FIGS. 4–6. FIG. 4 is an enlarged fragmentary sectional view of the bottom portion of the cage 40, the first stem portion 62, and the retainer 70 in their normal positions which are maintained as long as the temperature in the tank does not exceed a predetermined level. When the temperature exceeds this predetermined level, the fusible material ring 88 melts to allow the axial portion 72 of the retainer 70 to deflect. When the ring 88 melts, the downward force of the spring 90 on the first stem portion 62 pushes the first stem portion 62 axially inwardly. Since radially inward deflection of the axial retainer portion 72 is no longer resisted by the ring 88, the downward force of the spring 90 on the stem portion 62 causes the retainer portion 72 to deflect radially inwardly, as shown in FIG. 5. The deflecting of the retainer portion 72 allows the first stem portion 62 and the cage 40 to separate from each other, as shown in FIG. 6, and the valve plug and the cage 40 to move axially outwardly away from the opening 10 in the cap body 4. This provides immediate relief of pressure in the tank to prevent an explosion. Since the ring 88 is positioned on an axially inner portion of the stem, the melting of the ring 88 and the consequent thermally activated pressure relief are directly responsive to temperatures inside the tank, and in particular to the fuel temperature in an overturned condition.

The valve of the invention also provides protection against spillage of liquid out of the tank through the valve. When the tank is upright and the fuel level in the tank rises or the fuel sloshes in the tank and enters the valve chamber formed by the cage 40, the rising of the fuel level in the chamber causes the buoyant float 92 to move upwardly toward the poppet plate 18. The rising of the float 92 brings the valve element 106 into contact with the valve seat 22 to close the vent opening 20 and prevent liquid from exiting the valve chamber through the opening 20. When the valve element 106 is seated, its center portion contacts the protuberance 104 on the float 92, and the vertical axis of the protuberance 104 is within the seat 22. The weighted ball 110 remains in its position resting on the bottom of the frustoconical wall 48, as shown in FIG. 2. When the liquid level in the tank falls or the sloshing subsides, the float 92 descends and the valve element 106 unseats. The float 92 and valve element 106 return to the positions shown in FIG. 2.

The valve also provides protection against liquid spillage when the valve is in an overturned position, such as when the vehicle in which the tank and valve are installed overturns. Referring to FIG. 7, movement of the valve away from its upright position shown in FIG. 2 causes the weighted ball 110 to roll along the frustoconical surface 48 to move the float 92 toward the poppet plate 18 and seat the valve element 106. This closes the vent opening 20 to prevent fuel from spilling out of the tank through the vent opening 20. When the overturned condition is corrected, the weighted ball 110 rolls back to its rest position shown in FIG. 2 to allow the float 92 to descend and the valve element 106 to unseat. If the pressure in the tank rises to the predetermined magnitude while the tank is overturned, the stem and valve plug will move outwardly to relieve the pressure, as shown in FIG. 7. This allows some liquid spillage but also helps prevent dangerous overpressurization.

When the liquid level in the valve chamber falls and/or the valve is returned to its upright position, gravity causes the float 92 to descend toward its rest position shown in FIG. 2. The float 92 is small to accommodate the small size of the valve and is lightweight to ensure proper seating of the valve element 106 when liquid sloshes in the tank. Because of the relatively small size and light weight of the float 92, the action of gravity may not be sufficient to unseat the valve element 106. Vapor pressure within the valve chamber tends to hold the valve element 106 in its seated position. The pivotal mounting of the valve element 106 on the float 92 assists gravity in overcoming vapor pressure to unseat the valve element 106. As the float 92 descends, the attached end of the valve element 106 pivots on the mounting post 98. The pivoting of the valve element 106 allows it to act like a lever and increase the effective weight of the float 92 to overcome vapor pressure and unseat the valve element 106. In the preferred embodiment, the valve element 106 is made from a semirigid elastomeric material. Therefore, the element 106 flexes a small amount during the initial portion of the unseating sequence. The flexing of the valve element 106 provides a peeling action which assists the lever action of the valve element 106 to accomplish unseating. The relative flexibility of the element 106 may be varied to tailor the unseating characteristics of the element 106 to the needs of a particular situation.

The mounting post 98 and stop post 102 are positioned to contact the lower radial surface of the poppet plate 18 on opposite sides of the seat 22 when the cap 2 is subjected to an impact force of a predetermined magnitude. This prevents the seat 22 from damaging the valve element 106 and enables the cap 2 to withstand impact forces without impairment of the valve functioning. The posts 98,102 are positioned so that they do not contact the poppet plate 18 under normal operation of the valve. Contact occurs only when there is an impact force of a predetermined magnitude. The rounded protuberance 104 on the float 92 is dimensioned so that it also will not damage the valve element 106 when an impact occurs.

It will be obvious to those skilled in the art to which this invention is addressed that the invention may be used to advantage in a variety of situations. Therefore, it is also to be understood by those skilled in the art that various modifications and omissions in form and detail may be made without departing from the spirit and scope of the invention as defined by the following claims.

What is claimed is:

1. A pressure relief valve for a tank comprising:
    a valve plug positioned outwardly of an opening in the tank;
    a stem having a first portion and a second portion; said second portion being attached to the valve plug; and
    biasing means for exerting an axial, inward force on the first portion of the stem to put the stem in tension and bias the valve plug into a position in which it closes the opening;

one of said first and second portions having a first abutment surface; and said stem including a deflectable retainer portion carried by the other of said first and second portions and having a second abutment surface positioned to abut the first abutment surface to transmit axial forces between said first and second portions, and fusible material positioned radially between said other portion and said retainer portion substantially opposite said one portion to prevent said retainer portion from deflecting and to maintain said abutment surfaces in an abutting relationship, to in turn maintain said first and second portions in a force transmitting position relative to each other; and said biasing means being resilient to allow the stem and the valve plug to move outwardly in response to increased pressure in the tank to relieve pressure in the tank; and said fusible material being meltable at elevated temperatures exceeding a predetermined level, to allow said retainer portion to deflect, said first and second portions to separate from each other, and the valve plug and said second portion to move away from the opening.

2. The valve of claim 1, in which said abutment surfaces slope radially outwardly and axially inwardly.

3. The valve of claim 1, in which the first abutment surface is formed by said first portion, and said retainer portion is carried by said second portion.

4. The valve of claim 3, in which said abutment surfaces slope radially outwardly and axially inwardly.

5. The valve of claim 1, in which said retainer portion comprises an annular axially extending portion with a plurality of axial slots extending radially therethrough to allow said axially extending portion to deflect radially when said fusible material melts, said second abutment surface being formed by said axially extending portion, and said fusible material being positioned radially between said other portion and said axially extending portion.

6. The valve of claim 5, in which said abutment surfaces slope radially outwardly and axially inwardly.

7. The valve of claim 5, in which the fusible material is positioned on an axially inner portion of the stem to expose it directly to temperatures inside the tank.

8. The valve of claim 5, in which the first abutment surface is formed by said first portion, said retainer portion further comprises a radial portion extending radially inwardly from said axially extending portion and secured to said second portion, and said fusible material prevents said axially extending portion from deflecting radially inwardly.

9. The valve of claim 8, in which said abutment surfaces slope radially outwardly and axially inwardly.

10. The valve of claim 8, in which the fusible material is positioned on an axially inner portion of the stem to expose it directly to temperatures inside the tank.

11. The valve of claim 1, in which said second portion forms a cage; the valve plug has a vent opening for venting the tank, and the biasing means is calibrated to allow the stem and the valve plug to move outwardly when the pressure in the tank reaches a predetermined magnitude; and which further comprises a float positioned in the cage, and a valve element carried by the float to close the vent opening in response to a rising liquid level in the cage.

12. The valve of claim 11, in which the first abutment surface is formed by said first portion; said retainer portion comprises an annular axially extending portion with a plurality of axial slots extending radially therethrough to allow said axially extending portion to deflect radially when said fusible material melts, and a radial portion extending radially inwardly from said axially extending portion and secured to said cage; said second abutment surface is formed by said axially extending portion; and said fusible material is positioned radially between said cage and said axially extending portion to prevent said axially extending portion from deflecting radially inwardly.

13. The valve of claim 12, in which said abutment surfaces slope radially outwardly and axially inwardly.

14. The valve of claim 12, in which the fusible material is positioned on an axially inner portion of the cage to expose it directly to temperatures inside the tank.

15. The valve of claim 11, in which the fusible material is positioned on an axially inner portion of the cage to expose it directly to temperatures inside the tank.

16. The valve of claim 1, in which the fusible material is positioned on an axially inner portion of the stem to expose it directly to temperatures inside the tank.

17. In a cap for closing a fuel tank filling and venting tube; said cap being of the type having a main body with a central axial opening and means for detachably engaging said tube, and a pressure relief valve; said valve having a valve plug positioned outwardly of said opening, a stem attached to the valve plug, and biasing means for exerting an axial, inward force on the stem to put the stem in tension and bias the valve plug into a position in which it closes said opening; the improvement comprising:

a first portion of the stem on which the biasing means exerts said inward force, a second portion of the stem attached to the valve plug, one of said first and second portions having a first abutment surface, a deflectable retainer portion of the stem carried by the other of said first and second portions and having a second abutment surface positioned to abut the first abutment surface to transmit axial forces between said first and second portions, and fusible material positioned radially between said other portion and said retainer portion substantially opposite said one portion to prevent said retainer portion from deflecting and to maintain said abutment surfaces in an abutting relationship, to in turn maintain said first and second portions in a force transmitting position relative to each other; said biasing means being resilient to allow the stem and the valve plug to move outwardly in response to increased pressure in the tank to relieve pressure in the tank; and said fusible material being meltable at elevated temperatures exceeding a predetermined level, to allow said retainer portion to deflect, said first and second portions to separate from each other, and the valve plug and said second portion to move away from the opening.

18. The invention recited in claim 17, in which the first abutment surface is formed by said first portion, and said retainer portion is carried by said second portion.

19. The invention of claim 18, in which said abutment surfaces slope radially outwardly and axially inwardly.

20. The invention recited in claim 17, in which said retainer portion comprises an annular axially extending portion with a plurality of axial slots extending radially therethrough to allow said axially extending portion to deflect radially when said fusible material melts, said second abutment surface being formed by said axially extending portion, and said fusible material being positioned radially between said other portion and said axially extending portion.

21. The invention of claim 20, in which said abutment surfaces slope radially outwardly and axially inwardly.

22. The invention recited in claim 20, in which the first abutment surface is formed by said first portion, said retainer portion further comprises a radial portion extending radially inwardly from said axially extending portion and secured to said second portion, and said fusible material prevents said axially extending portion from deflecting radially inwardly.

23. The invention of claim 22, in which said abutment surfaces slope radially outwardly and axially inwardly.

24. The invention recited in claim 22, in which the fusible material is positioned on an axially inner portion of the stem to expose it directly to temperatures inside the tank, including fuel temperatures when the cap is in an overturned condition.

25. The invention recited in claim 20, in which the fusible material is positioned on an axially inner portion of the stem to expose it directly to temperatures inside the tank, including fuel temperatures when the cap is in an overturned condition.

26. The invention of claim 17, in which said abutment surfaces slope radially outwardly and axially inwardly.

27. The invention recited in claim 17, in which the fusible material is positioned on an axially inner portion of the stem to expose it directly to temperatures inside the tank, including fuel temperatures when the cap is in an overturned condition.

28. The invention recited in claim 17, in which said second portion forms a cage; the valve plug has a vent opening for venting the tank, the cap has passageway means communicating said vent opening with the exterior of said main body, and the biasing means is calibrated to allow the stem and the valve plug to move outwardly when the pressure in the tank reaches a predetermined magnitude; and which further comprises a float positioned in the cage, and a valve element carried by the float to close the vent opening in response to a rising liquid level in the cage.

29. The invention recited in claim 28, in which the first abutment surface is formed by said first portion; said retainer portion comprises an annular axially extending portion with a plurality of axial slots extending radially therethrough to allow said axially extending portion to deflect radially when said fusible material melts, and a radial portion extending radially inwardly from said axially extending portion and secured to said cage; said second abutment surface is formed by said axially extending portion; and said fusible material is positioned radially between said cage and said axially extending portion to prevent said axially extending portion from deflecting radially inwardly.

30. The invention recited in claim 29, in which said abutment surfaces slope radially outwardly and axially inwardly.

31. The invention recited in claim 29, in which the fusible material is positioned on an axially inner portion of the age to expose it directly to temperatures inside the tank, including fuel temperatures when the cap is in an overturned condition.

32. The invention recited in claim 28, in which the valve plug comprises a poppet plate through which the vent opening extends, and a cover spaced axially outwardly from the plate; which further comprises a first seal between the plate and the main body of the cap, and a second seal between the cover and said main body; and in which said passageway means extends from the vent opening, between the plate and the cover and between the first and second seals, and through said main body.

33. The invention recited in claim 28, in which the fusible material is positioned on an axially inner portion of the cage to expose it directly to temperatures inside the tank, including fuel temperatures when the cap is in an overturned condition.

34. In combination:
   a cap for closing a fuel tank filling and venting tube; said cap having a main body with an axial opening, and means for detachably engaging said tube; and
   a pressure relief valve comprising:
   a valve plug positioned outwardly of said axial opening and having a vent opening for venting the tank;
   biasing means for biasing the valve plug axially inwardly into a position in which it closes said axial opening, said biasing means having an inner end located axially inwardly of the valve plug and said axial opening;
   a structure forming an interconnection between the valve plug and said inner end of the biasing means; said structure including a cage; and
   a float positioned in the cage to normally allow venting through said vent opening and to close said vent opening in response to a rising liquid level in the cage;
   said structure including fusible material positioned to maintain said interconnection between the valve plug and said inner end of the biasing means; said biasing means being resilient to allow said structure and the valve plug to move outwardly in response to increased pressure in the tank to relieve pressure in the tank; and said fusible material being located inwardly of the valve plug and being meltable at elevated temperatures exceeding a predetermined level, to release said interconnection to allow the valve plug to move away from said axial opening.

35. The combination of claim 34, in which the cage is attached to the valve plug; said structure further includes an inner portion that engages said inner end of the biasing means; and said fusible material is positioned to maintain the cage and said inner portion in an interconnected position, and to allow the cage and said inner portion to move relative to each other away from said interconnected position, when said fusible material melts, to allow the valve plug to move outwardly away from said axial opening.

36. The combination of claim 35, in which the biasing means comprises a coil spring that surrounds the cage and forms said inner end; and said inner portion of said structure forms a spring abutment that engages said inner end of the spring.

* * * * *

UNITED STATES PATENT AND TRADEMARK OFFICE
CERTIFICATE OF CORRECTION

PATENT NO. : 5,325,882
DATED : July 5, 1994
INVENTOR(S) : Alan Forsythe, Zdenek Gabrlik and John Morris It is certified that error appears in the above-identified patent and that said Letters Patent is hereby corrected as shown below:

Col. 1, line 36, "simplicity/of" should be -- simplicity of --.

Col. 1, line 38, "thermally/activated should be -- thermally activated --.

Col. 2, line 47, delete "Pat.", second occurrence.

Col. 5, line 4, "popper" should be -- poppet --.

Col. 5, line 9, delete the comma after "passageway".

Col. 5, line 36, "popper" should be -- poppet --.

Col. 6, line 39, "popper" should be -- poppet --.

Col. 7, lines 32 and 33, 45, and 64, "popper" should be -- poppet --.

Col. 8, line 14, "popper" should be -- poppet --.

Col. 10, line 59, "popper" should be -- poppet --.

Claim 31, col. 15, line 64, "age" should be -- cage --.

Signed and Sealed this

Fourteenth Day of February, 1995

Attest:

BRUCE LEHMAN

*Attesting Officer*      *Commissioner of Patents and Trademarks*